US006173273B1

(12) United States Patent
Herbert

(10) Patent No.: US 6,173,273 B1
(45) Date of Patent: *Jan. 9, 2001

(54) SECURE COMMUNICATION SYSTEM WITH ENCRYPTED POSTAL INDICIA

(75) Inventor: Raymond John Herbert, Leigh-on-Sea (GB)

(73) Assignee: Neopost Limited, Romford (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/013,063

(22) Filed: Jan. 26, 1998

(30) Foreign Application Priority Data

Jan. 31, 1997 (GB) ..................................................... 9702099

(51) Int. Cl.[7] ..................................................... G06F 17/60

(52) U.S. Cl. ............................................. 705/62; 705/408

(58) Field of Search ............................... 705/1, 401, 408, 705/409, 410, 62; 380/23, 25, 51; 340/825.35; 283/71

(56) References Cited

U.S. PATENT DOCUMENTS

| | | | | |
|---|---|---|---|---|
| 4,641,347 | * | 2/1987 | Clark et al. | 380/3 |
| 5,142,557 | * | 8/1992 | Pastor | 705/62 |
| 5,480,239 | * | 1/1996 | Kim et al. | 400/120.09 |
| 5,586,036 | * | 12/1996 | Pintsov | 380/51 |
| 5,812,666 | * | 9/1998 | Baker et al. | 380/277 |
| 5,819,240 | * | 10/1998 | Kara | 705/408 |
| 5,835,604 | * | 11/1998 | Lee | 380/51 |
| 5,936,865 | * | 8/1995 | Pintsov et al. | 700/107 |
| 5,987,411 | * | 11/1999 | Lee et al. | 705/401 |
| 6,032,138 | * | 2/2000 | McFiggans et al. | 705/410 |
| 6,064,995 | * | 5/2000 | Sansone et al. | 705/410 |

FOREIGN PATENT DOCUMENTS 0 782 108 A2 * 7/1997 (EP) .

OTHER PUBLICATIONS

Darlin, Damon; Innovate or die; Feb. 1997; Forbes, v159, n4, p 108(3); DialogWeb copy p.104.*

* cited by examiner

*Primary Examiner*—Edward R. Cosimano
*Assistant Examiner*—Thomas A. Dixon
(74) *Attorney, Agent, or Firm*—Shoemaker and Mattare, LTD

(57) ABSTRACT

A secure communication system for transmission of messages utilizes postage meters as terminals of the system. The postage meters include means for input of postage amount, an encryptor to encrypt postage information to be printed by a printer of the meter. The input means are used for input of a message, the encryptor encrypts the message with a key unique for an intended recipient terminal and the printer prints the encrypted message on a mail item. The terminals also are provided with reading means to read a received encrypted message and the encryption means is utilized to decrypt the received encrypted message using the unique key of the recipient terminal.

12 Claims, 1 Drawing Sheet

SECURE COMMUNICATION SYSTEM WITH ENCRYPTED POSTAL INDICIA

BACKGROUND OF THE INVENTION

This invention relates to a system for secure communication of messages from an originator of a message to an intended recipient of the message.

In systems for applying postage indicia to mail items it has been proposed to include encrypted information in the imprint of the postage indicia in order to provide security in respect of the postage indicia. The information which is encrypted relates to the postage meter system utilized to print the indicia so as to identify the mailer and also relates to postage information, for example the amount of postage charge applicable to the mail item and for which accounting has been effected. The encrypted information may be printed as alphanumeric characters but it has also been proposed to print the encrypted information in the form of a so-called 2D code comprising an array of binary elements of first and second characteristics, for example black and white.

SUMMARY OF THE INVENTION

According to the invention a secure communication system includes a sender postage metering terminal and a plurality of recipient postage metering terminals, each terminal comprising input means for input of a postage charge; encryption means for encrypting postage information; printing means for printing a postage indicium including said encrypted postage information on a mail item; wherein the input means of the sender terminal is operable to input a message, intended for receipt by a designated one of the recipient terminals, to the encryption means of the sender terminal; said encryption means of the sender terminal being operable to encrypt said message using a key unique to the designated recipient terminal; and each recipient terminal including means for input of a received encrypted message to the encryption means of the recipient terminal; and the encryption means of the designated recipient terminal being operable to use a key unique to that terminal to decrypt the encrypted message.

BRIEF DESCRIPTION OF THE DRAWING

An embodiment of the invention will now be described with reference to the drawings in which.

DESCRIPTION OF THE PREFERRED EMBODIMENT

Figure 1:
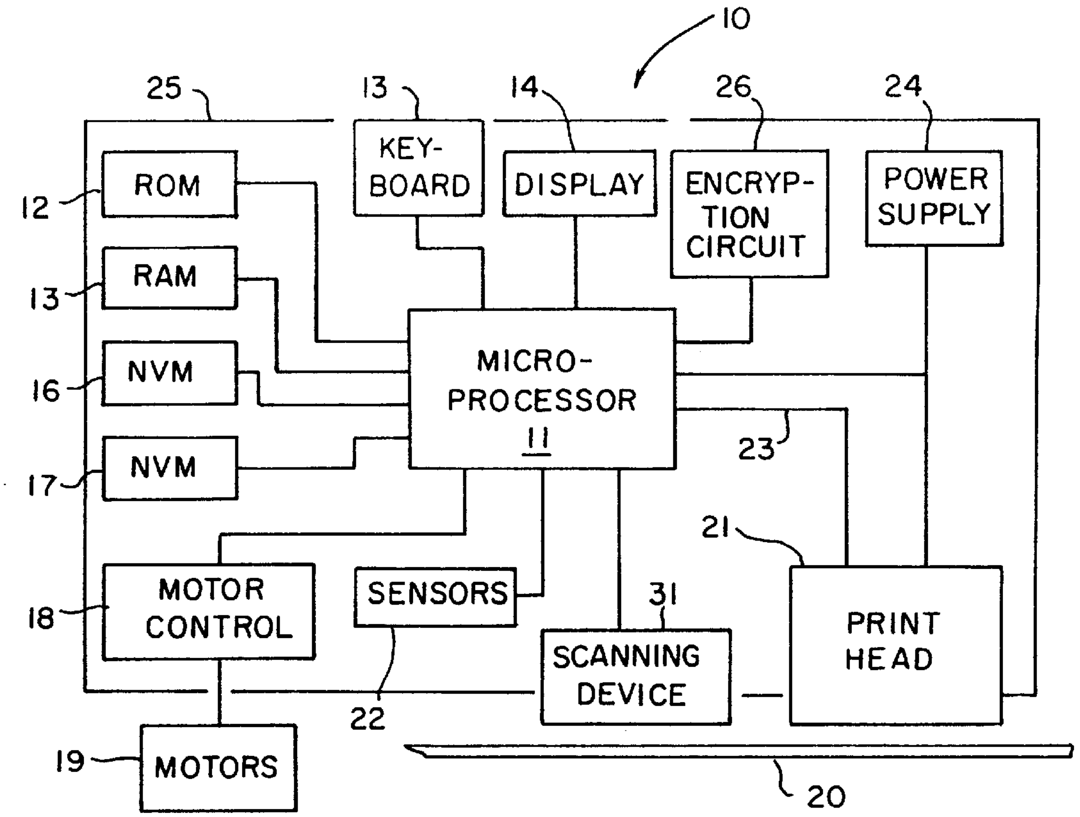
FIG. 1 is a block diagram of a postage meter for use as a terminal in a secure message transmission system.

Referring first to FIG. 1 of the drawings, a postage meter 10 includes electronic accounting and control means comprising a micro-processor 11 operating under program routines stored in a read only memory (ROM) 12. A keyboard 13 is provided for input of commands and data by a user and a display 14 is provided to enable display of information to the user. A random access memory (RAM) 13 is provided for use as a working store for storage of temporary data during operation of the postage meter. Non-volatile duplicated memories 16, 17 are provided for the storage of critical data relating to use of the postage meter and which is required to be retained even when the postage meter is now powered. The microprocessor 11 carries out accounting functions in relation to use of the postage meter for franking mail items with postage charges applicable to handling of the mail items by the postal authority or another carrier. Accounting data relating to use of the postage meter for printing franking impressions representing postage charges for mail items and any critical data to be retained is stored in the non-volatile memories 16, 17. The accounting data includes a value of credit available for use by the meter in franking mail items, an accumulated total of value used by the meter in franking mail items, a count of the number of mail items franked by the meter and a count of the number of mail items franked with a postage charge in excess of a predetermined value. The value of credit is stored in a descending credit register, the accumulated total value is stored in an ascending tote register, the count of items is stored in an items register and the count of items franked with a postage charge in excess of a predetermined value is stored in a large items register. As is well known in the postage meter art, each of the registers referred to hereinbefore for storing accounting data is replicated in order to enable integrity of the accounting data to be maintained even in the event of a fault or termination of power to the meter during a franking operation. Two replications of each of the registers are provided in each of the memory devices 16, 17.

A motor controller 18 is controlled by the microprocessor 11 to control operation of motors 19 driving feeding means (not shown) for feeding a mail item 20 past a digital print head 21. The digital print head 21 may be a thermal print head including selectively energisable thermal printing elements. Sensors 22 are provided to sense and monitor feeding of the mail item. The sensors provide signals to the microprocessor to enable the microprocessor to control feeding of the mail item and to selectively energize the thermal print elements of the print head at appropriate times as the mail item is fed past the print head. As the mail item is fed past the thermal printing elements of the print head 21 during a printing operation, the microprocessor outputs on line 23, in each of a series of printing cycles, print data signals selecting those ones of the printing elements which are to be energized in each respective printing cycle. A pulse of electrical power is supplied to the selected thermal printing elements from a power source 24.

The thermal printing elements are disposed in a line extending transversely to the direction in which the mail item is fed. Energisation of selected thermal printing elements of the print head in a printing cycle causes the thermal transfer selected areas of ink from an ink ribbon and repeated selection and energisation of selected printing elements in the series of printing cycles results in printing of dots in required positions of a corresponding series of columns spaced along the mail item in the direction of feeding of the item. Accordingly a complete printed impression is built up in a column by column manner in the series of printing cycles of a printing operation. It is to be understood that although the postage meter is described hereinbefore as including a thermal printer for printing franking impressions on mail items, the postage meter may include other types of digital printing device such as , for example, impact dot matrix, ink jet and laser.

It will be appreciated that, as is well known in the postage meter art, the postage meter must operate in a secure manner and be protected from attempts to use the meter fraudulently for example by utilizing the postage meter to print franking impressions on mail items for which no corresponding postage charge has been accounted for by the accounting means. Accordingly those parts of the postage meter required to be secured against authorized tampering are housed in a secure housing 25.

In order to provide security in the printed postage indicium, the postage meter is provided with means to encrypt information. In the present embodiment as illustrated in FIG. 1, the encryption means is an encryption circuit 26 connected to the microprocessor 11.

However if desired encryption of the information may be effected by the microprocessor 11 operating under a software routine. Postage information, which includes the postage amount and may include other data as well, is encrypted by the encryption circuit 26, or by the microprocessor 11, and the resulting encrypted information is included as part of the information included in the postage indicium printed by the print head.

When carrying out a franking operation, postage information including a postage charge to be applied to the mail item 20 is input to the microprocessor 11 by means of a keyboard 13. The microprocessor 11 carries out accounting functions in respect of the postage charge and the encryption circuit 26 operates on the postage information to generate encrypted information. The encrypted information is input to the microprocessor which then outputs print signals to the print head to cause the print head to print a postage indicium 27 (see FIG. 2) including the postage information and the encrypted information on a mail item. The postage information may be printed in visually readable form 28 and also in machine readable code form 29, for example 2D code comprising an array of pixels representing the information.

In accordance with the present invention it is proposed to utilize the postage meter 10 to print additional information 30 comprising a message encrypted in the form of a 2D code and to enable the reading and decrypting of this message by use of a recipient's postage meter. The message 30 may be printed on the exterior of the mail item 20 and may be printed in the same printing operation as that in which the postage indicium 27 is printed or the message may be printed on an insert placed inside an envelope. The message is encrypted utilizing the encryption circuit 26 in a manner to ensure that it is intelligible only to an intended recipient. Accordingly the message is encrypted using data unique to the recipient's postage meter and this data may for example comprise a serial number of the meter or a security key. In addition, or alternatively, a secret key may be used in the encryption of the additional information. The secret key would be a key known only to both the sender and the intended recipient of the information and use of this key would be agreed by the sender and intended recipient prior to sending the message.

The postage meter, as shown in FIG. 1, is provided with a scanning device 31 housed in the housing 25. The scanning device 31 is connected to the microprocessor 11 and is operable to scan information in 2D code form on a received mail item 20. The item 20 carries the postage indicium which may include both the visually readable portion 28 and a portion 29 in 2D code. In addition the item carries the encrypted message 30 in 2D code. When the item is received the message on the item is scanned by the scanning device 31 and electrical scanning signals resulting from the scanning of the item are input to the microprocessor 11. The microprocessor inputs these scanning signals to the encryption circuit 26 which is operable to utilize data unique to that recipient terminal, for example the security key or the serial number of the meter, to decrypt the scanned encrypted information and thereby produce the message in non-encrypted form. The encryption circuit outputs the decrypted message to the microprocessor where it may be displayed on the display 14 or may be output to the print head 21 to produce a printed copy of the message. It will be appreciated that if the message is received by a person other than the intended recipient the message will not be intelligible to that person in its encrypted form and the message can not be decrypted without the key known to the intended recipient.

Figure 2:
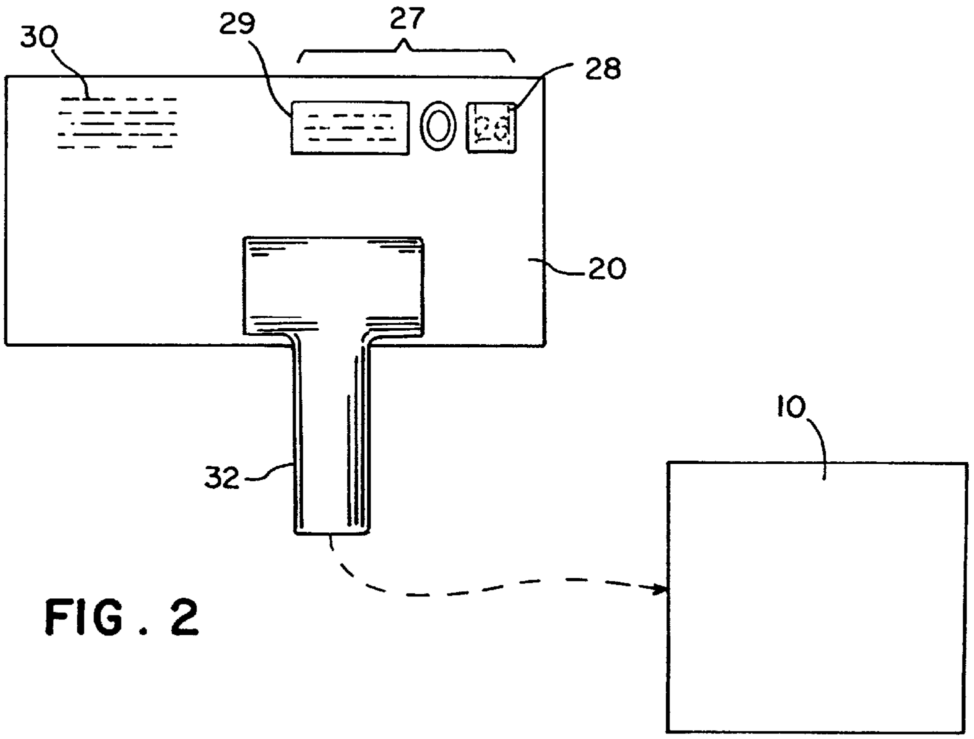
FIG. 2 illustrates a hand held scanning device connected to the postage meter.

The scanning device may be a device 14 housed in the housing of the postage meter as shown in FIG. 1 or may be a hand held device 32 connected by a flexible cable 33 to the postage meter 10 as shown in FIG. 2.

As mentioned hereinbefore, instead of providing an encryption circuit to encrypt postage information, encryption of the postage information may be effected by the microprocessor operating under the control of a software program routine. It is to be understood that information to be included in a secure message likewise may be encrypted by the microprocessor and a received message be decrypted by the microprocessor operating under a software routine.

By printing the encrypted message in 2D code relatively high density of the information contained in the message may be attained. Accordingly a relatively long message which in plain text alpha characters would occupy more than one page could be contained within 2D code printed on an item the size of a conventional postcard.

While it may be convenient to use the same code for the printing of the postage indicium 29 and the message 30, the code used for printing the message 30 may be different from the code used to print the postage indicium 29. For example, the postage indicium may be printed using a code known as PDF417 while the message may be printed using a Datamatrix code. If obtaining high density in printing of the message is not required, the encrypted message may be printed in alphanumeric characters. An encrypted message printed in the form of alphanumeric characters could be scanned by the scanning device 31 or 32 and the microprocessor may be operated under character recognition software to generate signals representing the alphanumeric characters for input to the encryption circuit or the alphanumeric characters of the printed encrypted message may be input by an operator using the keyboard 13.

The secure message transmission system described hereinbefore may be used for internal mail within a company where each department has a terminal as shown in the drawing comprising a personal computer to which is connected a secure unit, a printer and a scanning device. The item of mail would be addressed, by a visually readable destination address, to an intended recipient department or person and the item would bear a message printed in encrypted form for that department or person. Upon receipt of the item, the message would be input to the computer either by scanning or, if the encrypted message is printed in alphanumeric characters, by input on the keyboard. An operator in the intended recipient department, or the intended recipient person, then enters identification information by means of the keyboard, by means of a card read by the scanning device or by a smart card coupled via reading means to the computer. The identification information input to the computer consists of or includes a key for use by the decryption circuit of the secure module to decrypt the encrypted message.

If desired, a database of keys for use in encryption and decryption of information may be located at a postal authority centre for use by operators of the franking machine message transmission terminals. Access to the database may be provided by the same communication means utilized for other communications of the franking machine and postal authority centre for example as used when resetting credit in the franking machines.

Hereinbefore, the terminal for transmission and reception of a secure message has been described as a dedicated postage meter. However postage metering systems are known comprising a secure postage metering unit connected to a personal computer. The secure postage metering unit performs the secure accounting functions and encryption functions of a dedicated postage meter but does not include the printer of a dedicated postage meter. Accordingly, if desired the terminal may comprise a secure postage metering unit connected to a personal computer.

Postage meters operating in a pre-payment mode include non-volatile registers storing values of credit available for use in franking operations. In the same manner, the secure postage metering unit includes a non-volatile register storing a value of credit. Since the message transmitted from one terminal is to a designated recipient, the secure message transmission system described hereinbefore may be utilized to transfer value stored in the non-volatile register of one terminal to a non-volatile register of a designated terminal.

What is claimed is:

1. A secure communication system including a sender postage metering terminal and a plurality of recipient postage metering terminals, each sender and recipient terminal comprising input means for input of postage information including a postage charge; encryption means for encrypting said postage information; printing means for printing a postage indicium including said encrypted postage information on a mail item; wherein the input means of the sender terminal is operable to input a message, intended for receipt by a designated one of the recipient terminals, to the encryption means of the sender terminal; said encryption means of the sender terminal being operative to encrypt said message using a first key unique to the designated one of the recipient terminals to produce an encrypted message; and each recipient terminal including means for input of the encrypted message received from the sender terminal to the encryption means of the recipient terminal; and the encryption means of the designated one of the recipient terminals being operable to use a second key unique to said designated one of said terminals to decrypt the encrypted message received from the sender terminal.

2. A secure communication system as claimed in claim 1 wherein the printing means of the sender terminal is operable to print the encrypted message on a mail item and wherein the input means of the recipient terminals includes means to read the printed encrypted message from the mail item.

3. A secure communication system as claimed in claim 2 wherein the printing means of the sender terminal is operable to print the encrypted message in the form of a 2D code.

4. A secure communication system as claimed in claim 2 wherein the printing means of the recipient terminal is operable to print the decryption of the encrypted message.

5. A secure communication means as claimed in claim 2 wherein the recipient terminal includes display means operable to display the decryption of the encrypted message.

6. A secure communication system as claimed in claim 2 wherein the means for reading the encrypted message includes a hand-held scanner connected to the recipient terminal.

7. A secure communication system as claimed in claim 1 wherein the key unique to the recipient terminal comprises an identification number of the designated terminal.

8. A secure communication system as claimed in claim 1 wherein the key unique to the recipient terminal comprises a secure secret key.

9. A secure communication system as claimed in claim 1 wherein the terminals each comprise a secure postage metering unit connected to a computer and a printer connected to the computer.

10. A secure communication system including a sender postage metering terminal and a plurality of recipient postage metering terminals, each sender and recipient terminal comprising input means for input of postage information including a postage charge; encryption means for encrypting said postage information; printing means for printing a postage indicium including said encrypted postage information on a mail item; wherein the input means of the sender terminal is operable to input a message, intended for receipt by a designated one of the recipient terminals, to the encryption means of the sender terminal; said encryption means of the sender terminal being operative to encrypt said message using a first key unique to the designated one of the recipient terminals to produce an encrypted message; the printer means of the sender terminal being operative to print the encrypted message on the mail item and each recipient terminal including input means to read the encrypted message printed on the mail item received from the sender terminal; and the encryption means of the designated one of the recipient terminals being operative to use a second key unique to said designated one of said recipient terminals to decrypt the encrypted message received from the sender terminal.

11. A secure communication system including:

a sender postage metering terminal and a plurality of recipient postage metering terminals;

said sender terminal including:

first input means operable to input postal information including a postage charge;

first encryption means operative to produce encrypted postage information by encrypting at least the postage charge of the postal information;

printing means operative to print a postage indicium including said encrypted postage information on a mail item;

said input means of the sender terminal being further operable to input a message, intended for receipt by a designated one of the recipient terminals, to said encryption means of the sender terminal;

said first encryption means of the sender terminal being operative to produce an encrypted message by encryption of said message using a first key unique to the designated recipient terminal;

each said recipient terminal including:

second input means operable to input the encrypted message when received from the sender terminal;

second encryption means operative in response to input of the received encrypted message to reproduce the message by decryption of the encrypted message using a second key unique to said recipient terminal.

12. A postage metering terminal for use in a secure communication system comprising:

input means operable to input postal information including a postage charge and to input a message;

encryption means operative to produce encrypted postage information by encrypting at least the postage charge of the postal information and to produce an encrypted message by encryption of said message using a key unique to a designated one of a plurality of postage metering terminals intended to receive said encrypted message; and printing means operative to print a postage indicium including said encrypted postage information and to print said encrypted message on a mail item.

* * * * *